United States Patent
Ro et al.

(10) Patent No.: US 10,657,655 B2
(45) Date of Patent: May 19, 2020

(54) VR CONTENT SICKNESS EVALUATING APPARATUS USING DEEP LEARNING ANALYSIS OF MOTION MISMATCH AND METHOD THEREOF

(71) Applicant: Korea Advanced Institute of Science and Technology, Yuseong-gu, Daejeon (KR)

(72) Inventors: YongMan Ro, Yuseong-gu (KR); Hak Gu Kim, Yuseong-gu (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 286 days.

(21) Appl. No.: 15/882,693

(22) Filed: Jan. 29, 2018

(65) Prior Publication Data

US 2019/0180448 A1    Jun. 13, 2019

(30) Foreign Application Priority Data

Dec. 12, 2017 (KR) .......................... 10-2017-0169844

(51) Int. Cl.

| | |
|---|---|
| *G06T 7/246* | (2017.01) |
| *G06T 19/00* | (2011.01) |
| *G06T 7/73* | (2017.01) |
| *G06K 9/62* | (2006.01) |
| *G06K 9/00* | (2006.01) |

(52) U.S. Cl.
CPC .......... *G06T 7/246* (2017.01); *G06K 9/00335* (2013.01); *G06K 9/6202* (2013.01); *G06T 7/73* (2017.01); *G06T 2207/20084* (2013.01); *G06T 2207/30196* (2013.01)

(58) Field of Classification Search
USPC .................................................. 382/107, 103
See application file for complete search history.

(56) References Cited

U.S. PATENT DOCUMENTS

| | | | | |
|---|---|---|---|---|
| 5,966,680 | A  * | 10/1999 | Butnaru ................ | A61M 21/00 702/150 |
| 8,690,750 | B2 * | 4/2014 | Krueger ................ | A61M 21/00 600/27 |
| 8,831,278 | B2 * | 9/2014 | Fedorovskaya ...... | G02B 27/017 382/103 |
| 2012/0134543 | A1 * | 5/2012 | Fedorovskaya ...... | G02B 27/017 382/107 |
| 2014/0176296 | A1 * | 6/2014 | Morgan ................. | G06F 3/011 340/4.13 |
| 2016/0167672 | A1 * | 6/2016 | Krueger ............... | H04N 13/366 340/576 |
| 2017/0273552 | A1 * | 9/2017 | Leung ....................... | A61B 3/02 |
| 2018/0089901 | A1 * | 3/2018 | Rober .................... | B60K 37/06 |
| 2019/0172264 | A1 * | 6/2019 | Oh ........................ | G06T 19/006 |

* cited by examiner

*Primary Examiner* — Ishrat I Sherali
(74) *Attorney, Agent, or Firm* — Christensen O'Connor Johnson Kindness PLLC

(57) ABSTRACT

A VR content sickness evaluating apparatus using a deep learning analysis of a motion mismatch and a method thereof are provided. The VR content sickness evaluating apparatus analyzes a motion mismatch phenomenon between visual recognition information and posture recognition information, which occurs when a user views VR content, using deep learning and predicts and evaluates a degree of VR sickness from a difference between motion features.

12 Claims, 11 Drawing Sheets

VR CONTENT SICKNESS EVALUATING APPARATUS USING DEEP LEARNING ANALYSIS OF MOTION MISMATCH AND METHOD THEREOF

CROSS-REFERENCE TO RELATED APPLICATIONS

A claim for priority under 35 U.S.C. § 119 is made to Korean Patent Application No. 10-2017-0169844 filed on Dec. 12, 2017, in the Korean Intellectual Property Office, the entire contents of which are hereby incorporated by reference.

BACKGROUND

Embodiments of the inventive concept described herein relate to a virtual reality (VR) content sickness evaluating apparatus using a deep learning analysis of a motion mismatch and a method thereof, and more particularly, relate to technologies of analyzing a motion mismatch phenomenon which occurs when a user views VR content based on deep learning and predicting and evaluating sickness.

Recently, VR content has attracted attention as next-generation content like real reality from researchers, industrial worlds, and consumers. Particularly, since there is a high probability that VR content will be used as various applications such as games, broadcasts, entertainments, and training, the scale of related markets is quickly expanded.

VR content may provide a sense of immersion and a sense of reality as if users exist in real image spaces to them by providing a 360-degree image captured as a spherespace. Thus, the user may recognize an image of a wide viewing angle and may move his or her body to look all around a 360-degree image captured as a spherespace.

Herein, as an interest in VR content is more increased, there is much growing concern about viewing safety of users.

For example, when users view VR content with a high sense of immersion, it is known that most users feel cyber-sickness or VR sickness together with extreme fatigue. Further, when viewers view VR content, it is known that most viewers who feel fatigue or sickness continue having the symptoms for a time after viewing the VR content.

In this case, there are a variety of factors, such as a wide viewing angle, an image distortion, and a low frame rate, as causes which induce VR sickness. One of the most important factors is a mismatch between motion of VR content, that is, simulation motion and real motion of a user.

Hereinafter, a description will be given in detail of a cause which induces VR sickness with reference to FIG. 1.

FIG. 1 is a drawing illustrating an example of VR sickness generated by a mismatch between simulation motion and real motion of a user.

In general, VR content often has fast and diverse motion to provide a vivid sense of immersion to a user. For example, there are a plurality of 360-degree roller coaster images, 360-degree racing images, and the like as VR content. On the other hand, most users sit in chairs or stand while wearing their head-mounted displays (HMDs) and view VR content without large motion.

In this case, there is a mismatch between motion information (or visual recognition information) the user receives with his or her eyes and motion information (or posture recognition information) he or she receives through his or her vestibular organ which recognizes motion and postures of his or her body.

When determining motion of a person's body, a person's brain may finally determine motion through visual recognition information, posture recognition information, and sensory information. However, when a user views VR content having fast and diverse motion, motion recognized through his or her eyes may be very fast or motion recognized through a vestibular organ may be very static. As a result, a brain may feel confusion about motion determination due to a motion mismatch between visual recognition information and posture recognition information, and the user may feel VR sickness due to the confusion.

To address a viewing safety problem of such VR content, there is a need for technologies of analyzing motion of the VR content and motion of the user and automatically evaluating VR sickness in a quantitative manner based on the analyzed motion.

However, according to the related art, there is only a subjective evaluation research in which the user views VR content during a predetermined time and writes a questionnaire about VR sickness or a research of measuring bio-signals while he or she views VR content. Such a subjective evaluation research or a research of measuring the bio-signals needs much time and manpower, and there is a limit in which practicality is very low.

Thus, the inventive concept may propose practical technologies of automatically evaluating VR sickness of VR content to automatically analyze important VR sickness inducing factors such as a motion mismatch between visual recognition information and posture recognition information and predict and evaluate a degree of VR sickness in a quantitative manner based on the important VR sickness inducing factors.

SUMMARY

Embodiments of the inventive concept provide technologies of analyzing a motion mismatch phenomenon between visual recognition information and posture recognition information, which occurs when a user views VR content, using deep learning and predicting and evaluating a degree of VR sickness from a different between motion features.

According to an aspect of an embodiment, a VR content sickness evaluating apparatus may include a visual recognition analyzing unit configured to analyze visual recognition information according to a visual recognition motion feature based on a change in motion of VR content, a posture recognition analyzing unit configured to analyze posture recognition information according to a posture recognition motion feature based on a change in motion of a user, the change being received from a sensing module, and a discriminator configured to determine a degree of sickness induced by the VR content from a difference between the visual recognition information and the posture recognition information.

The visual recognition analyzing unit may be configured to analyze a change in motion of the VR content the user recognizes with his or her eyes, using a convolutional neural network (CNN) and a convolutional long short-term memory (conv LSTM) and extract the visual recognition information of motion information according to the visual recognition motion feature of a temporal factor and a spatial factor using the CNN and the conv LSTM.

The posture recognition analyzing unit may be configured to analyze a temporal change in head location information received from the sensing module including at least one or more of a motion sensor configured to obtain motion information of the user and a VR player worn by the user, using an LSTM and extract the posture recognition motion feature using the LSTM.

The posture recognition analyzing unit may be configured to analyze a temporal change characteristic of three-dimensional (3D) space coordinates received from the sensing module depending on a change in motion of the user and the posture recognition motion feature and extract the posture recognition information of motion information.

The visual recognition analyzing unit may be configured to generate a visual recognition motion map which is a motion map from an extracted visual recognition motion feature. The posture recognition analyzing unit may be configured to generate a posture recognition motion map which is a motion map from an extracted posture recognition motion feature.

The discriminator may be configured to generate a motion mismatch map through a difference between the visual recognition motion map and the posture recognition motion map.

The discriminator may be configured to discriminate real motion or fake motion for the generated motion mismatch map by discriminating between the generated motion mismatch map and a real motion mismatch map.

The discriminator may be configured to quantify and evaluate a sickness degree obtained from difference data between the visual recognition information and the posture recognition information and a sickness obtained from the generated motion mismatch map.

According to another aspect of an embodiment, an operation method of a VR content sickness evaluating apparatus may include analyzing visual recognition information according to a visual recognition motion feature based on a change in motion of VR content, analyzing posture recognition information according to a posture recognition motion feature based on a change in motion of a user, the change being received from a sensing module, and determining a degree of sickness induced by the VR content from a difference between the visual recognition information and the posture recognition information.

The analyzing of the visual recognition information may include analyzing a change in motion of the VR content the user recognizes with his or her eyes, using a CNN and a conv LSTM and extracting the visual recognition information of motion information according to the visual recognition motion feature of a temporal factor and a spatial factor using the CNN and the conv LSTM.

The analyzing of the posture recognition information may include analyzing a temporal change in head location information received from the sensing module including at least one or more of a motion sensor configured to obtain motion information of the user and a VR player worn by the user, using an LSTM and extracting the posture recognition motion feature using the LSTM.

The analyzing of the posture recognition information may include analyzing a temporal change characteristic of 3D space coordinates received from the sensing module depending on a change in motion of the user and the posture recognition motion feature and extracting the posture recognition information of motion information.

The determining of the degree of the sickness induced by the VR content may include generating a motion mismatch map through a difference between a visual recognition motion map and a posture recognition motion map, discriminating between the generated motion mismatch map and a real motion mismatch map, and quantifying and evaluating a sickness degree obtained from difference data between the visual recognition information and the posture recognition information and a sickness obtained from the generated motion mismatch map.

The discriminating between the generated motion mismatch map and the real motion mismatch map may include discriminating real motion or fake motion for the generated motion mismatch map.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
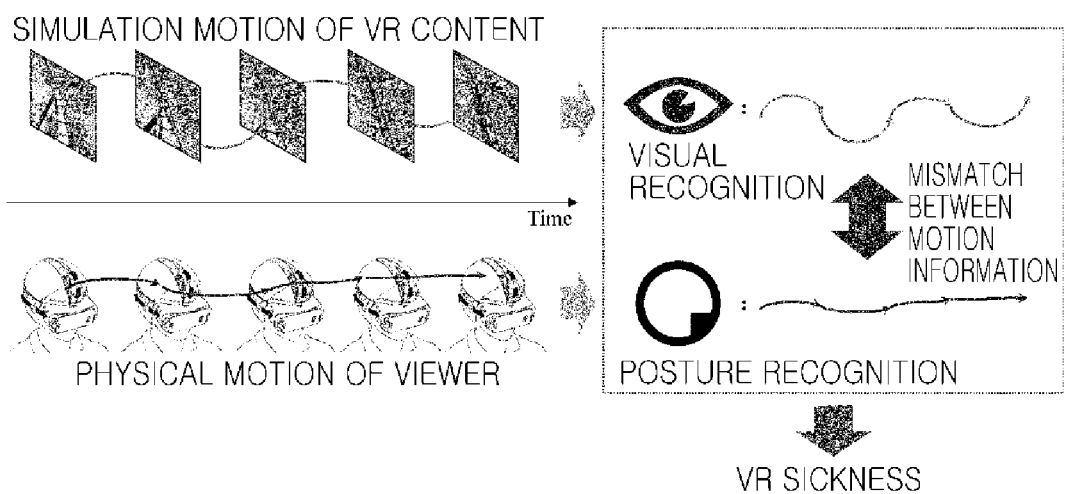
FIG. 1 is a drawing illustrating an example of VR sickness generated by a mismatch between simulation motion and real motion of a user.

Hereinafter, a description will be given in detail of embodiments with reference to the accompanying drawings. However, the present disclosure is restricted or limited to embodiments of the present disclosure. Further, like reference numerals shown in each drawing indicates like members.

Further, the terminology used in the specification may be terms used to properly represent an exemplary embodiment of the present disclosure and may vary according to intention of a user or an operator or custom of a field included in the present disclosure. Therefore, the terminology will be defined based on contents across the specification.

Figure 2:
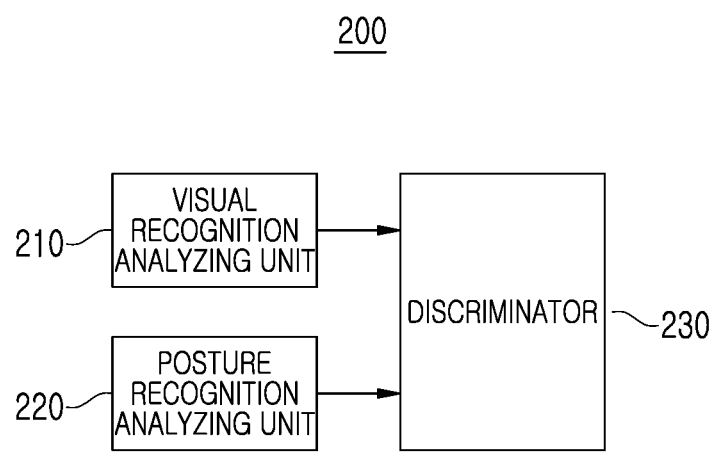
FIG. 2 is a block diagram illustrating a detailed configuration of a VR content sickness evaluating apparatus according to an embodiment of the inventive concept.

FIG. 2 is a block diagram illustrating a detailed configuration of a VR content sickness evaluating apparatus according to an embodiment of the inventive concept.

Referring to FIG. 2, the VR content sickness evaluating apparatus according to an embodiment of the inventive concept may analyze a motion mismatch phenomenon which occurs when a user views VR content based on deep learning and may predict and evaluate sickness.

For this purpose, a VR content sickness evaluating apparatus 200 according to an embodiment of the inventive concept may include a visual recognition analyzing unit 210, a posture recognition analyzing unit 220, and a discriminator 230.

The visual recognition analyzing unit 210 may analyze visual recognition information according to a visual recognition motion feature based on a change in motion of VR content.

The visual recognition analyzing unit 210 may analyze a change in motion of VR content the user recognizes with his or her eyes, using a convolutional neural network (CNN) and a convolutional long short-term memory (conv LSTM) and may extract visual recognition information of motion information according to a visual recognition motion feature of a visual factor and a spatial factor using the CNN and the conv LSTM.

For example, when viewing VR content, a viewer may recognize both of a change in spatial information about the VR content and a change in spatial information over time. Thus, the visual recognition analyzing unit 210 should consider both of a spatial factor and a temporal factor of the VR content to analyze and extract motion information obtained through visual recognition. Thus, the visual recognition analyzing unit 210 according to an embodiment of the inventive concept may use at least one or more of a CNN, a convolutional auto-encoder, and a residual network (ResNet) which are useful to learn a spatial factor of VR content and a recurrent neural network (RNN), an LSTM, and a conv LSTM which are useful to learn a temporal factor of the VR content, in a deep network environment for analyzing and extracting a visual recognition motion feature.

Thus, the visual recognition analyzing unit 210 may extract visual recognition information of motion information according to an extracted visual recognition motion feature in the deep network environment.

In this case, the spatial factor may be a sickness inducing factor, such as an image distortion or a viewing angle problem by a stitching process of stitching images of several angles, which has a spatial characteristic and induces sickness. The temporal factor may be a sickness inducing factor, such as fast motion or fast rotation in an image, which has a temporal characteristic and induces sickness.

The spatial factor and the temporal factor may be associated with each other to induce fatigue and sickness to the user. For example, if an image distortion or fast motion occurs in only anyone frame in VR content, there may be a low probability that the user will feel extreme fatigue or cybersickness by the image distortion or the fast motion. However, if an image distortion or fast motion occurs in several substantially consecutive frames, VR content the user feels may be very low in quality. Thus, the visual recognition analyzing unit 210 should consider both of the spatial factor and the temporal factor capable of inducing sickness in the VR content.

The posture recognition analyzing unit 220 may analyze posture recognition information according to a posture recognition motion feature based on a change in motion of the user, received from a sensing module.

The posture recognition analyzing unit 220 may analyze a temporal change in head location information received from the sensing module including at least one or more of a motion sensor which obtains motion information of the user and a VR player worn by the user and may extract a posture recognition motion feature. In detail, the posture recognition analyzing unit 220 may receive at least one or more of a head motion degree when the user views VR content, a viewing posture of the user, and a focus movement degree of the user and three-dimensional (3D) space coordinates and may analyze a temporal change characteristic and a posture recognition motion characteristic from information received using an LSTM, thus extracting posture recognition information of motion information from the analyzed result. In this case, the VR player may be a head-mounted display (HMD), and the motion sensor may be a gyro sensor.

The posture recognition analyzing unit 220 may receive 3D space coordinates for head motion of the user or a change in posture of the user over time from the sensing module. Herein, the posture recognition analyzing unit 220 should learn a visual factor for received space information and posture information to analyze and extract a posture recognition motion feature form posture information of the user, for example, head information. For this purpose, the posture recognition analyzing unit 220 according to an embodiment of the inventive concept may use at least one or more of an RNN and an LSTM which are useful to learn a temporal factor, in a deep network environment for analyzing and extracting a posture recognition motion feature.

Thus, the posture recognition analyzing unit 220 may extract posture recognition information according to an extracted posture recognition motion feature in the deep network environment.

The discriminator 230 may determine a degree of sickness induced by VR content from a difference between visual recognition information and posture recognition information.

If the user wears the HMD which is the VR player and views VR content, the discriminator 230 may predict and evaluate a VR sickness degree by comparing a difference between visual recognition information analyzed based on a change in motion of the VR content and posture recognition information analyzed based on a change in motion of the user.

For example, the discriminator 230 may generate a motion mismatch map through a difference between a visual recognition motion map and a posture recognition motion map in a deep network environment which uses a deep generative model based on deep learning and adversarial learning. In this case, the visual recognition motion map may be generated from the virtual recognition analyzing unit 210, and the posture recognition motion map may be generated from the posture recognition analyzing unit 220. The visual recognition motion map and the posture recognition motion map may be motion maps according to a visual recognition motion feature and a posture recognition motion feature.

Thereafter, the discriminator 230 may discriminate real motion or fake motion for the generated motion mismatch map by discriminating between the generated motion mismatch map and a real motion mismatch map. Further, the discriminator 230 may quantify and evaluate a sickness degree obtained from difference data between visual recognition information and posture recognition information and a sickness degree obtained from the generated motion mismatch map.

The discriminator 230 may learn a relationship between sickness scores. For example, a sickness degree may be evaluated using scores between "0" to "10". As an index is lower, the user may feel less VR sickness. As the index is higher, the user may feel more VR sickness. Herein, according to an embodiment, the discriminator 230 may provide at least one of a percentage, an image, a picture, a graph, a message, and a voice other than (or concurrently with) a quantitative numeric value for a sickness degree. According to another embodiment, the discriminator 230 may output at least one notification signal among a warning message, an alarm, a voice, light, and vibration.

Figure 3:
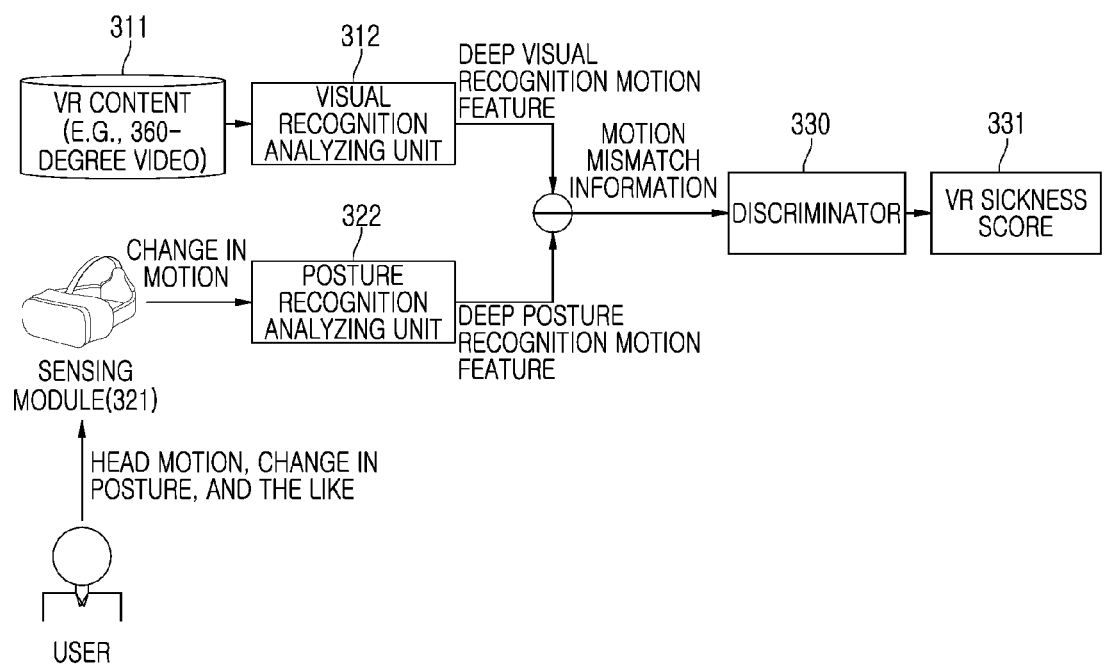
FIG. 3 is a conceptual diagram illustrating a VR content sickness evaluating apparatus according to an embodiment of the inventive concept.

FIG. 3 is a conceptual diagram illustrating a VR content sickness evaluating apparatus according to an embodiment of the inventive concept.

In detail, FIG. 3 is a conceptual diagram illustrating an apparatus for predicting and evaluating a degree of VR sickness for a mismatch between visual recognition information and posture recognition information through a deep learning analysis according to an embodiment of the inventive concept.

Technology proposed from an embodiment of the inventive concept may be composed of a visual recognition motion analyzing module based on deep learning, a posture recognition motion analyzing module based on deep learning, a VR sickness predicting and evaluating module based on a difference between analyzed motion features. Referring to FIG. 3, a visual recognition analyzing unit 312 may include the visual recognition motion analyzing module. A posture recognition analyzing unit 322 may include the posture recognition motion analyzing module. A discriminator 330 may include the VR sickness predicting and evaluating module.

A VR content sickness evaluating apparatus according to an embodiment of the inventive concept may learn using VR content 311 (e.g., a 360-degree video) and data for a change in motion of VR content obtained from a sensing module 321 (e.g., an HMD) which plays back the VR content 311 and a change in posture and motion of a user.

The visual recognition analyzing unit 312 may learn a deep network for analyzing a change in motion of the VR content 311 and extracting a visual recognition motion feature. In other words, the visual recognition analyzing unit 312 may analyze motion information the user recognizes with his or her eyes through the deep network and may extract visual recognition information according to a visual recognition motion feature.

The posture recognition analyzing unit 322 may learn the deep network for analyzing motion information (or head motion) while the user views the VR content 311 based on a change in motion of the user, received from the sensing module 321, and extracting a posture recognition motion feature. As a result, the posture recognition analyzing unit 322 may analyze real physical motion of the user, that is, motion information recognized by a vestibular organ through the deep network and may extract posture recognition information according to a posture recognition motion feature.

Thereafter, the discriminator 330 may learn a relationship between degrees of VR sickness from a mismatch (difference) between the extracted different motion information, that is, a deep visual recognition motion feature (or visual recognition information) and a deep posture recognition motion feature (or posture recognition information) and may calculate a VR sickness score 331. For example, the discriminator 330 may evaluate a sickness degree using scores between "0" to "10". As a mismatch degree or index between visual recognition information according to a visual recognition motion feature and posture recognition information according to a posture recognition motion feature is lower, the user may feel less VR sickness. As the mismatch degree or index is higher, the user may feel more VR sickness.

In other words, the quantified VR sickness score 331 may be used as a guideline for making VR content to help to make more secure VR content.

Figure 4A:
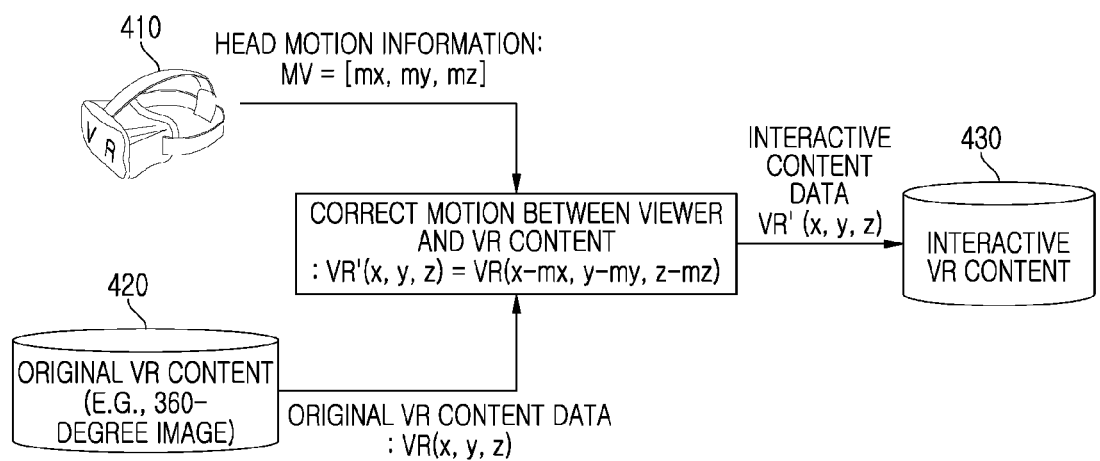
FIGS. 4A and 4B are drawings illustrating a process of obtaining interactive VR content according to an embodiment of the inventive concept.
Figure 4B:
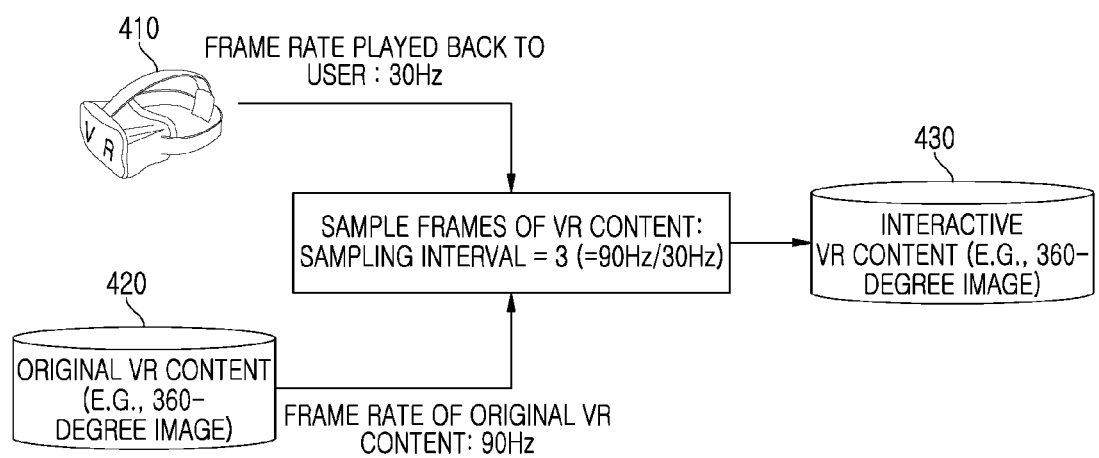

FIGS. 4A and 4B are drawings illustrating a process of obtaining interactive VR content according to an embodiment of the inventive concept.

In detail, FIG. 4A is a drawing illustrating a process of obtaining interactive VR content by reflecting head motion of a user. FIG. 4B is a drawing illustrating a process of obtaining interactive VR content by reflecting a frame rate of a VR player.

Referring to FIG. 4A, a VR content sickness evaluating apparatus according to an embodiment of the inventive concept may obtain interactive VR content 430 by reflecting head motion information of the user who wears a VR player 410 on his or her head in original VR content 420.

Assuming that coordinates of a specific point in a specific frame of the original VR content 420 indicate VR(x, y, z) and coordinates of a vector in which the user moves his or her head while viewing the original VR content 420 indicate (mx, my, mz), coordinates of a specific point from a line of sight of the user may indicate VR'(x, y, z)=VR(x−mx, y−my, z−mz).

For example, when a soccer ball is located on the center of a specific frame of the original VR content 420 associated with a soccer, if the user moves his or her head to move his or her line of sight to an upper side, the soccer ball in the interactive VR content 430, seen from the line of sight of the user, may be located on a lower side of the specific frame.

Referring to FIG. 4B, the VR content sickness evaluating apparatus according to an embodiment of the inventive concept may obtain the interactive VR content 430 by reflecting a frame rate of the original VR content 420 and a playable frame rate of the VR player 410.

Although the number of frames per second in the original VR content 420, that is, a frame rate is fast, if the VR player 410 provides VR content to the user at a lower frame rate, a frame rate of the interactive VR content 430 the user feels may be different from the frame rate of the original VR content 420.

For example, although the frame rate of the original VR content 420 is 90 Hz, if a frame rate of the VR player 410 is only 30 Hz, the frame rate of the interactive VR content 430 may be 30 Hz which is slower than the frame rate of the original VR content 420. In this case, the VR content sickness evaluating apparatus according to an embodiment of the inventive concept may determine a sickness degree in consideration of a sampling interval (=90 Hz/30 Hz=3).

According to an embodiment, the VR content sickness evaluating apparatus according to an embodiment of the inventive concept may obtain the interactive VR content 430 by reflecting image rendering, time delay, and the like other than the frame rate in the original VR content 420.

Figure 5:
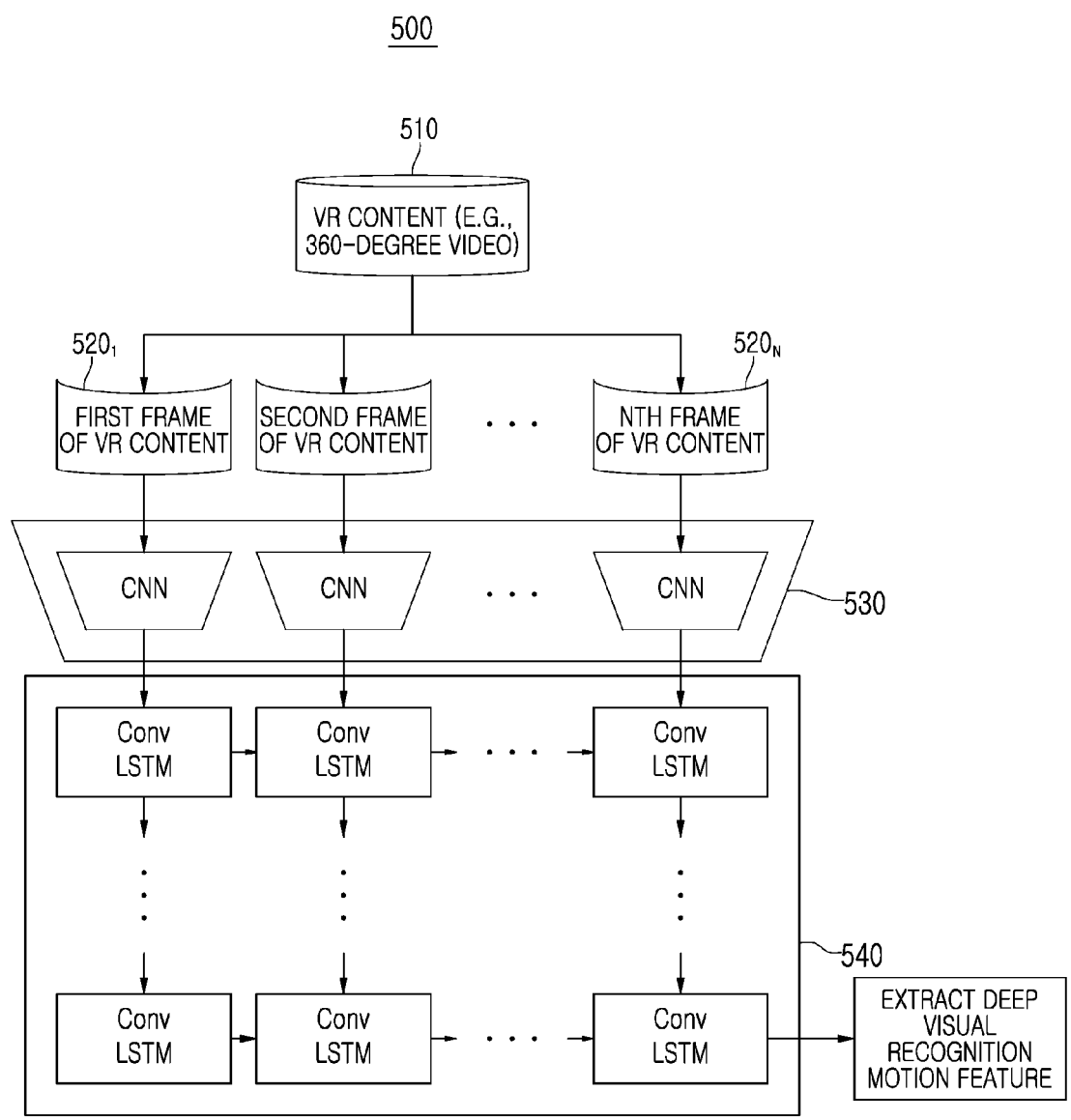
FIG. 5 is a drawing illustrating an example of a structure of a deep network for analyzing and extracting a visual recognition motion feature according to an embodiment of the inventive concept.

FIG. 5 is a drawing illustrating an example of a structure of a deep network for analyzing and extracting a visual recognition motion feature according to an embodiment of the inventive concept.

Referring to FIG. 5, a visual recognition analyzing unit 500 of a VR content sickness evaluating apparatus may apply a spatial algorithm 530 and a temporal algorithm 540 to each of a plurality of frames $520_1$ to $520_N$ of VR content 510 to analyze visual recognition information according to a visual recognition motion feature (or extract a deep visual recognition motion feature). For example, in general, a user may recognize both of spatial information and a change in spatial information over time while viewing the VR content 510. Thus, the visual recognition analyzing unit 500 should consider both of a spatial factor and a temporal factor of the VR content 510 to analyze and extract motion information obtained through visual recognition. In addition, cybersickness or VR sickness induced while the user views the VR content 510 may be closely related to a spatial factor and a temporal factor.

The spatial factor may be a sickness inducing factor, such as an image distortion or a viewing angle problem by a stitching process of stitching images of several angles, which has a spatial characteristic and induces sickness. The temporal factor may be a sickness inducing factor, such as fast motion or fast rotation in an image, which has a temporal characteristic and induces sickness.

The spatial factor and the temporal factor may be associated with each other to induce sickness to the user. For example, if an image distortion or fast motion occurs in only anyone frame in VR content, there may be a low probability that the user will feel extreme fatigue or cybersickness by the image distortion or the fast motion. However, if an image distortion or fast motion occurs in several substantially consecutive frames, VR content the user feels may be very low in quality. Thus, the visual recognition analyzing unit 500 should consider both of the spatial factor and the temporal factor capable of inducing sickness in the VR content.

In FIG. 5, an embodiment is exemplified as a CNN is used as the algorithm 530 for extracting a spatial factor of the VR content 510. However, embodiments are not limited thereto. For example, a deep learning algorithm, such as a convolutional auto-encoder or a ResNet, which is useful to learn a spatial characteristic or a short temporal characteristic may be used as the algorithm 530.

In FIG. 5, an embodiment is exemplified as a conv LSTM is used as the algorithm 540 for extracting a temporal factor of the VR content 510. However, embodiments are not limited thereto. For example, a deep learning algorithm, such as an RNN, an LSTM, or a gated recurrent unit (GRU), which is useful to learn a temporal characteristic may be used as the algorithm 540.

Figure 6:
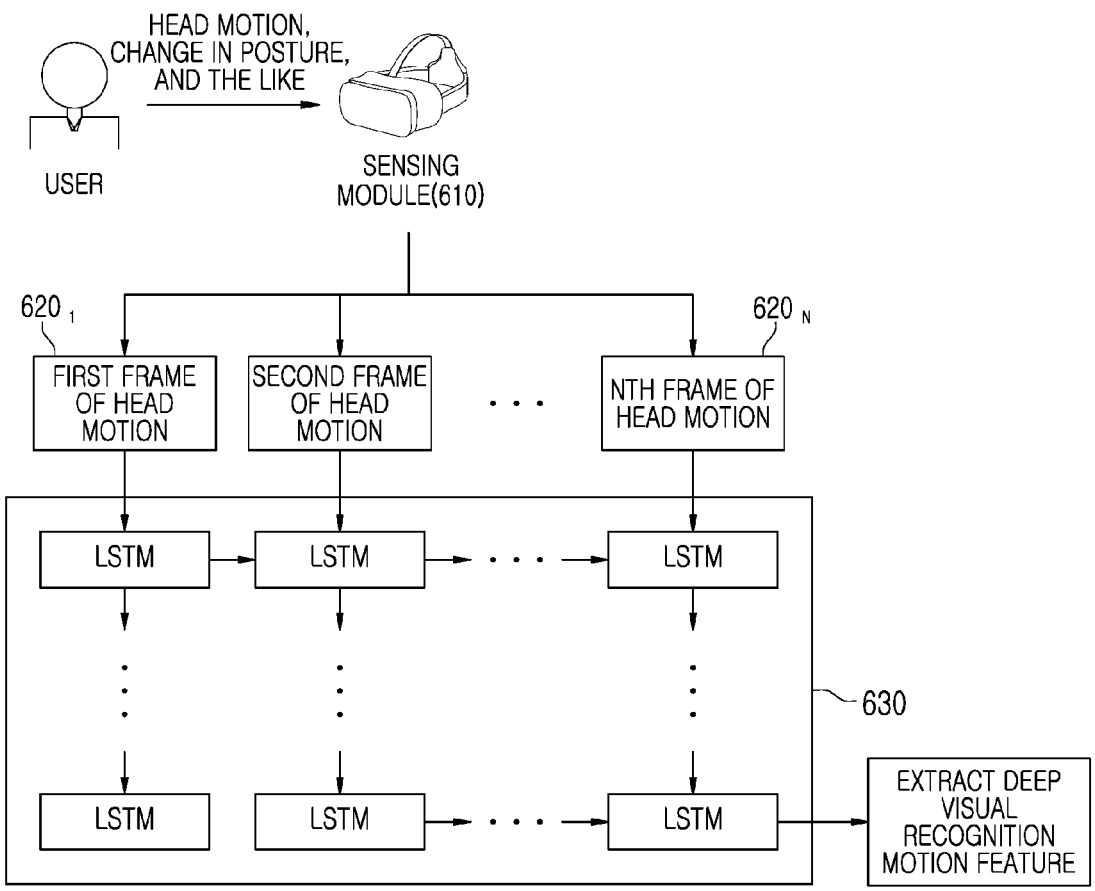
FIG. 6 is a drawing illustrating an example of a structure of a deep network for analyzing and extracting a posture recognition motion feature according to an embodiment of the inventive concept.

FIG. 6 is a drawing illustrating an example of a structure of a deep network for analyzing and extracting a posture recognition motion feature according to an embodiment of the inventive concept.

Referring to FIG. 6, a posture recognition analyzing unit 600 of a VR content sickness evaluating apparatus according to an embodiment of the inventive concept may apply a temporal algorithm 630 to each of a plurality of frames 620₁ to 620$_N$ of spatial information and posture information obtained from a sensing module 610 to analyze posture recognition information according to a posture recognition motion feature (or extract a deep posture recognition motion feature).

The posture recognition analyzing unit 600 may receive spatial information about head motion of a user or a change in posture of the user over time, for example, 3D space coordinates from a VR player or a motion sensor. Herein, the posture recognition analyzing unit 600 should learn a temporal change characteristic of head location information to analyze and extract a posture recognition motion feature from the received 3D space coordinates. In this case, cybersickness or VR sickness induced from head motion and a change in posture according to a change in motion of the user are closely related to a temporal factor.

In FIG. 6, an embodiment is exemplified as an LSTM is used as the algorithm 630 for extracting a temporal factor of space information (e.g., 3D space coordinates) and posture information (e.g., head location information of the user) received from the sensing module 610. However, embodiments are not limited thereto. For example, a deep learning algorithm, such as an RNN, a conv LSTM, or a GRU, which is useful to learn a temporal characteristic, may be used as the algorithm 630.

Figure 7:
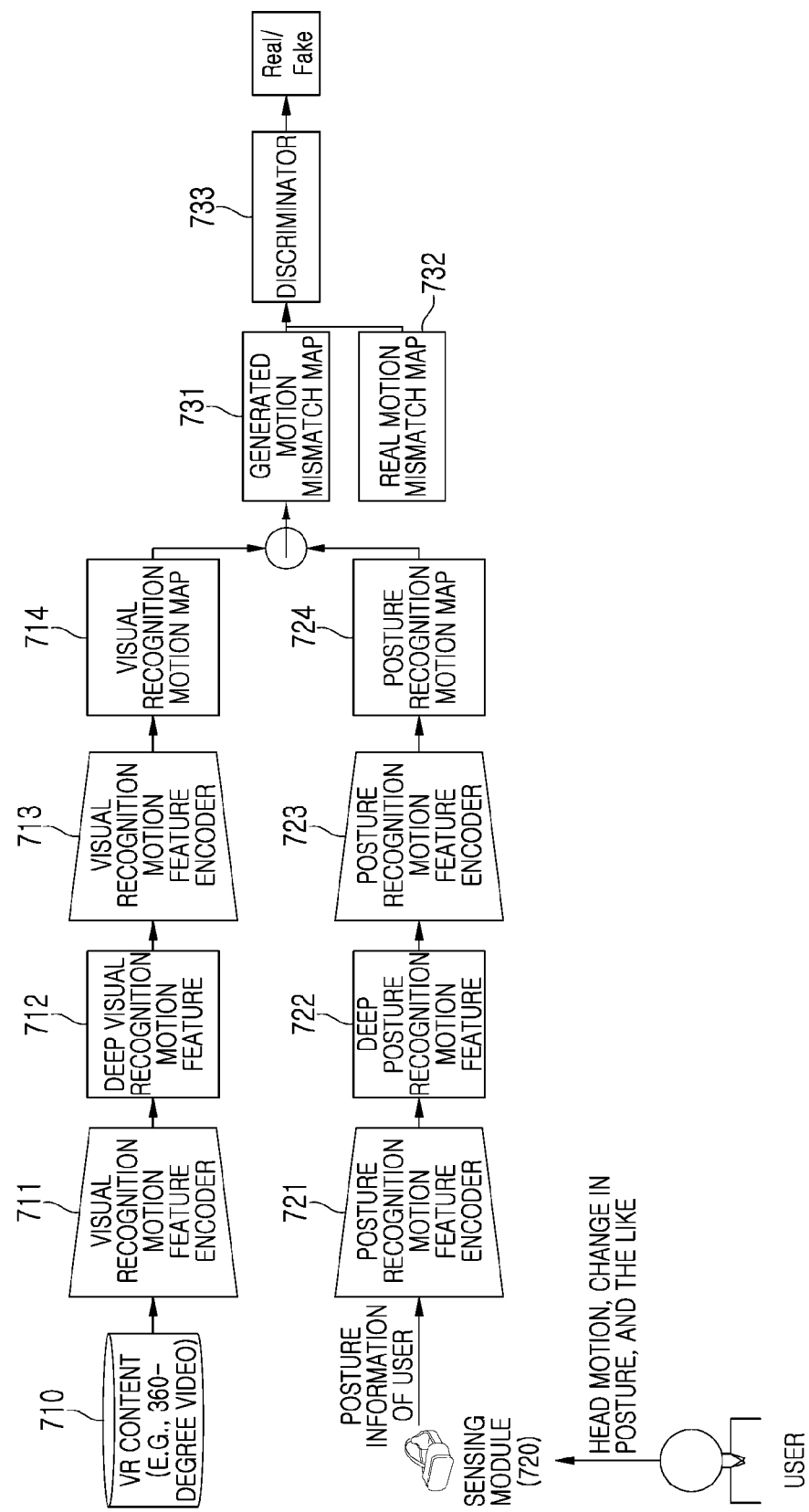
FIG. 7 is a conceptual diagram illustrating a VR content sickness evaluating apparatus based on deep learning according to an embodiment of the inventive concept.

FIG. 7 is a conceptual diagram illustrating a VR content sickness evaluating apparatus based on deep learning according to an embodiment of the inventive concept.

In detail, FIG. 7 is a conceptual diagram illustrating a VR content sickness evaluating apparatus according to an embodiment of the inventive concept using a deep generative model and adversarial learning. The VR content sickness evaluating apparatus according to an embodiment of the inventive concept may analyze a better visual recognition motion feature, a better posture recognition motion feature, and a better motion mismatch feature with reference to FIG. 7.

Referring to FIG. 7, the VR content sickness evaluating apparatus according to an embodiment of the inventive concept may generate a motion mismatch map 731 using a visual recognition motion map 714 and a posture recognition motion map 724 obtained from generative models, each of which includes an encoder and a decoder, and may perform adversarial learning of the generated motion mismatch map 731 and a real motion mismatch map 732 using a discriminator 733 to evaluate and determine real motion or fake motion.

Referring to FIG. 7, a visual recognition motion feature encoder 711, a deep visual recognition motion feature 712, and a visual recognition motion feature decoder 713 may indicate a visual recognition analyzing unit 210 (or a visual recognition generative module) of a VR content sickness evaluating apparatus according to an embodiment of the inventive concept shown in FIG. 2. A posture recognition motion feature encoder 721, a deep posture recognition motion feature 722, and a posture recognition motion feature decoder 723 may indicate a posture recognition analyzing unit 220 (or a posture recognition generative model) shown in FIG. 2. The discriminator 733 may be a discriminator 230 of the VR content sickness evaluating apparatus according to an embodiment of the inventive concept shown in FIG. 2.

The visual recognition motion feature encoder 711 and the posture recognition motion feature encoder 721 may respectively extract the deep visual recognition motion feature 712 and the deep posture recognition motion feature 722 from a change in motion of VR content 710 and a change in motion of a user, received from a sensing module 720. The visual recognition motion feature decoder 713 and the posture recognition motion feature decoder 723 may respectively predict and generate a visual recognition motion map 714 and a posture recognition motion map 724, which are motion maps, from the deep visual recognition motion feature 712 and the deep posture recognition motion feature 722 extracted by the visual recognition motion feature encoder 711 and the posture recognition motion feature encoder 721.

Thus, the VR content sickness evaluating apparatus according to an embodiment of the inventive concept may generate a mismatch map 731 between two recognized motion through a difference between the visual recognition motion map 714 and the posture recognition motion map 724. Further, the discriminator 733 may be configured to use the generated motion mismatch map 731 and a real motion mismatch map 732 which is a ground truth as inputs.

The discriminator 733 may determine whether the generated motion mismatch map 731 is real motion or fake motion by comparing and analyzing the generated motion mismatch map 731 with the real motion mismatch map 732.

In other words, a visual recognition generative model and a posture recognition generative model may be learned to extract the motion mismatch map 731 which is more accurately generated, through adversarial learning. The discriminator 733 may be learned to more accurately discriminate between the real motion mismatch map 732 and the generated motion mismatch map 731. As a result, the VR content sickness evaluating apparatus according to an embodiment of the inventive concept may enhance performance of predicting and generating a motion mismatch map of a deep network structure using a generative model (e.g., a visual recognition generative model and a posture recognition generative model) and adversarial learning and may also increase accuracy of predicting and evaluating VR sickness based on motion mismatch information which is more accurately predicted.

Figure 8A:
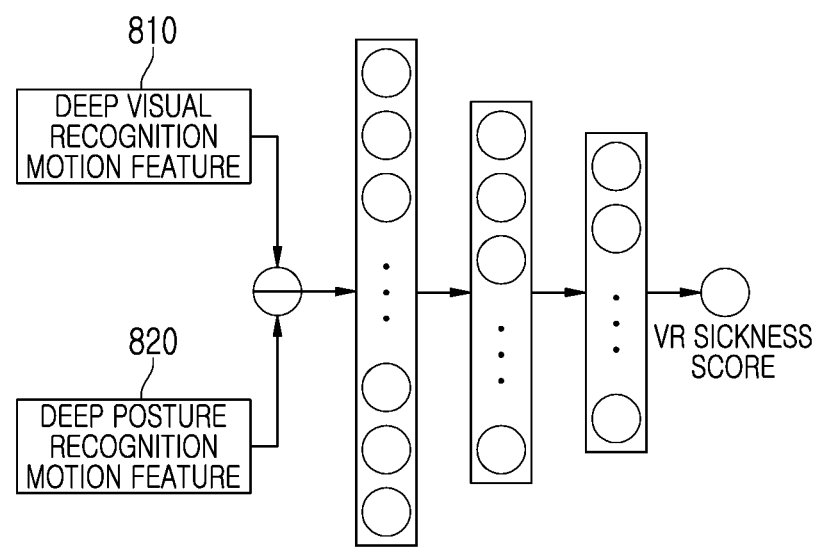
FIGS. 8A and 8B are drawings illustrating an example of a structure of a deep network for predicting and evaluating a VR sickness score in a quantitative manner according to an embodiment of the inventive concept.
Figure 8B:
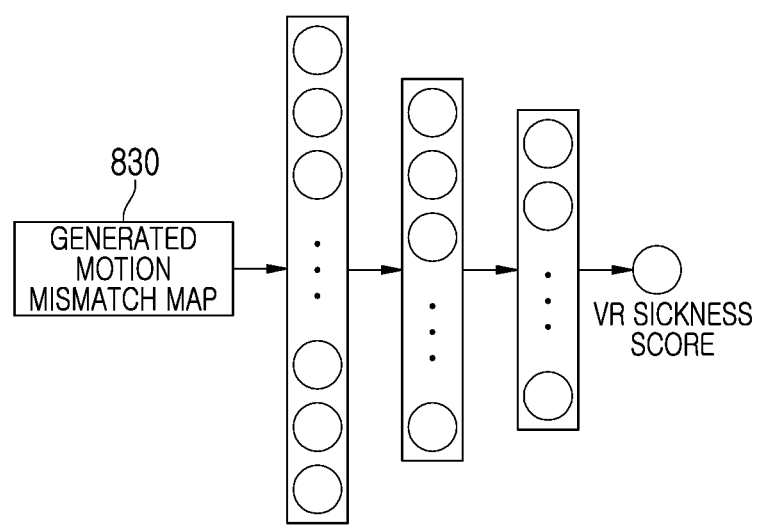

FIGS. 8A and 8B are drawings illustrating an example of a structure of a deep network for predicting and evaluating a VR sickness score in a quantitative manner according to an embodiment of the inventive concept.

A VR content sickness evaluating apparatus according to an embodiment of the inventive concept may predict and evaluate a VR sickness score in a quantitative manner from information about a difference between a visual recognition motion feature and a posture recognition motion feature. For this purpose, the VR content sickness evaluating apparatus according to an embodiment of the inventive concept may learn a relationship between a motion feature difference between extracted visual recognition information and extracted posture recognition information and a VR sickness score. In this case, a difference value ($|f_{vis} - f_{vesti}|$) between a deep visual recognition motion feature $f_{vis}$ 712 extracted in FIG. 7 and a deep posture recognition motion feature $f_{vest}$ 722 extracted in FIG. 7 or information about a motion mismatch map 731 obtained through a generative model or adversarial learning may be used.

A structure of a discriminator of the VR content sickness evaluating apparatus according to an embodiment of the inventive concept may be a deep learning structure, for example, a deep neural network (DNN).

As shown in FIGS. 8A and 8B, a sickness inducing factor may include, for example, vector data in which a weight value which influences an interactive quality index, such as a motion speed of VR content, rotation motion of a VR content image, image stitching, head motion of a user, or an image distortion according to head motion of the user and a change in posture of the user, is considered. Data including each sickness inducing factor may be predicted as a VR sickness index for VR content while passing through a DNN. According to an embodiment, to enhance generation performance of a learned deep network, the discriminator of the VR content sickness evaluating apparatus according to an embodiment of the inventive concept may increase in performance using a normalization technique such as drop out or pruning.

Referring to FIG. 8A, the VR content sickness evaluating apparatus according to an embodiment of the inventive concept may measure a quantitative index for VR sickness from a difference vector between a deep recognition motion feature 810 and a deep posture recognition motion feature 820. Referring to FIG. 8B, the VR content sickness evaluating apparatus according to an embodiment of the inventive concept may measure a quantitative index for VR sickness from a generated motion mismatch map 830. In other words, the VR content sickness evaluating apparatus according to an embodiment of the inventive concept may learn a relationship between VR sickness scores.

According to an embodiment, if there is no VR sickness score for real motion obtained through a previous subject test, the VR content sickness evaluating apparatus according to an embodiment of the inventive concept may calculate and normalize a difference between the motion feature vectors 810 and 820 and a size of a motion mismatch from the motion mismatch map 830 to relatively predict and evaluate a VR sickness score.

Figure 9:
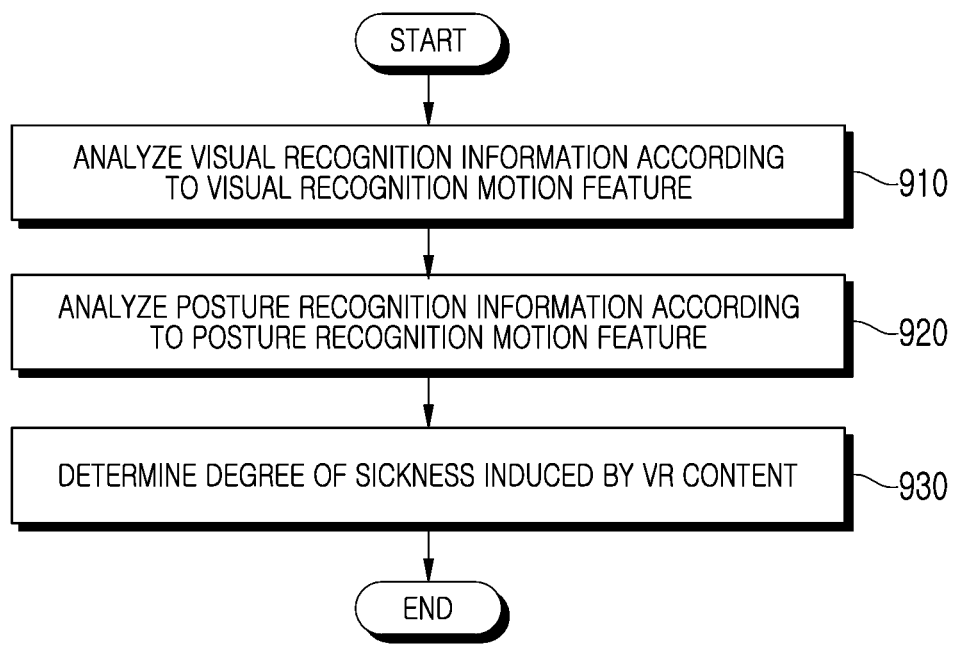
FIG. 9 is a flowchart illustrating a VR content sickness evaluating method according to an embodiment of the inventive concept.

FIG. 9 is a flowchart illustrating a VR content sickness evaluating method according to an embodiment of the inventive concept.

The method shown in FIG. 9 may be performed by a VR content sickness evaluating apparatus according to an embodiment of the inventive concept shown in FIG. 2.

In operation 910, the VR content sickness evaluating apparatus may analyze visual recognition information according to a visual recognition motion feature based on a change in motion of VR content.

Operation 910 may be analyzing a change in motion of VR content a user recognizes with his or her eyes, using a CNN and a conv LSTM and extracting visual recognition information of motion information according to a visual recognition motion feature of a temporal factor and a spatial factor using the CNN and the conv LSTM.

For example, a viewer may recognize both spatial information about VR content and a change in spatial information over time when viewing the VR content. Thus, the VR content sickness evaluating apparatus should consider both a spatial factor and a temporal factor of VR content to analyze and extract motion information obtained through visual recognition. Thus, operation 910 may be extracting visual recognition information according to a visual recognition motion feature using at least one or more of a CNN, a convolutional auto-encoder, and a ResNet which are useful to learn a spatial factor of VR content and an RNN, an LSTM, and a conv LSTM which are useful to learn a temporal factor of the VR content.

In operation 920, the VR content sickness evaluating apparatus may analyze posture recognition information according to a posture recognition motion feature based on a change in motion of the user, received from a sensing module.

Operation 920 may be analyzing a temporal change in head location information received from the sensing module which includes at least one or more of a motion sensor for obtaining motion information of the user and a VR player worn by the user and extracting a posture recognition motion feature, using an LSTM. In this case, the VR player may be an HMD, and the motion sensor may be a gyro sensor.

Further, operation 920 may be analyzing a temporal change characteristic of 3D space coordinates received from the sensing module depending on a change in motion of the user and a posture recognition motion feature and extracting posture recognition information of motion information.

In operation 930, the VR content sickness evaluating apparatus may determine a degree of sickness induced by VR content from a difference between the visual recognition information and the posture recognition information.

Operation 930 may include generating a motion mismatch map through a difference between a temporal recognition motion map and a posture recognition motion map, discriminating between the generated motion mismatch map and a real motion mismatch map, and quantifying and evaluating a sickness degree obtained from difference data between visual recognition information and posture recognition information and a sickness degree obtained from the generated motion mismatch map.

In this case, the discriminating between the generated motion mismatch map and the real motion mismatch map may discriminating real motion or fake motion for the generated motion mismatch map.

The foregoing devices may be realized by hardware elements, software elements and/or combinations thereof. For example, the devices and components illustrated in the exemplary embodiments of the inventive concept may be implemented in one or more general-use computers or special-purpose computers, such as a processor, a controller, an arithmetic logic unit (ALU), a digital signal processor, a microcomputer, a field programmable array (FPA), a programmable logic unit (PLU), a microprocessor or any device which may execute instructions and respond. A processing unit may implement an operating system (OS) or one or software applications running on the OS. Further, the processing unit may access, store, manipulate, process and generate data in response to execution of software. It will be understood by those skilled in the art that although a single processing unit may be illustrated for convenience of understanding, the processing unit may include a plurality of processing elements and/or a plurality of types of processing elements. For example, the processing unit may include a plurality of processors or one processor and one controller. Alternatively, the processing unit may have a different processing configuration, such as a parallel processor.

Software may include computer programs, codes, instructions or one or more combinations thereof and configure a processing unit to operate in a desired manner or independently or collectively control the processing unit. Software and/or data may be permanently or temporarily embodied in any type of machine, components, physical equipment, virtual equipment, computer storage media or units or transmitted signal waves so as to be interpreted by the processing unit or to provide instructions or data to the processing unit. Software may be dispersed throughout computer systems connected via networks and be stored or executed in a dispersion manner. Software and data may be recorded in one or more computer-readable storage media.

The methods according to the above-described exemplary embodiments of the inventive concept may be recorded in computer-readable media including program instructions to implement various operations embodied by a computer. The media may also include, alone or in combination with the program instructions, data files, data structures, and the like. The program instructions recorded in the media may be designed and configured specially for the exemplary embodiments of the inventive concept or be known and available to those skilled in computer software. Computer-readable media include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Program instructions include both machine code, such as produced by a compiler, and files containing higher level code that may be executed by the computer using an interpreter. The described hardware devices may be configured to act as one or more software modules to perform the operations of the above-described exemplary embodiments of the inventive concept, or vice versa.

According to an embodiment of the inventive concept, the VR content sickness evaluating apparatus may analyze a motion mismatch phenomenon between visual recognition information and posture recognition information, which occurs the user views VR content, using deep learning and may predict and evaluate a degree of VR sickness from a difference between motion features.

Further, according to an embodiment of the inventive concept, the VR content sickness evaluating apparatus may prevent extreme fatigue, cybersickness, or the like capable of being generated to the user after the user views VR content.

Further, according to an embodiment of the inventive concept, the VR content sickness evaluating apparatus may use a quantified score as a guideline for making VR content by determining whether the VR content induces sickness of any degree to the user in a quantitative manner.

According to an embodiment of the inventive concept, the VR content sickness evaluating apparatus may use a quantified VR sickness score throughout a VR market such as digital content making, VR, broadcasting and the movies, entertainment, and viewing safety standardization by analyzing motion of VR content and motion of the user and predicting and evaluating VR sickness in a quantitative manner.

While a few exemplary embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits, are combined or coupled in different forms and modes than as described above or be substituted or switched with other components or equivalents.

Therefore, other implements, other embodiments, and equivalents to claims are within the scope of the following claims.

What is claimed is:

1. A virtual reality (VR) content sickness evaluating apparatus, the apparatus comprising:
   a memory; and
   at least one processor connected to the memory, and configured to execute computer readable instructions included in the memory,
   wherein the at least one processor is configured to
   analyze visual recognition information according to a visual recognition motion feature based on a change in motion of VR content;
   analyze posture recognition information according to a posture recognition motion feature based on a change in motion of a user, the change being received from a sensing module; and
   determine a degree of sickness induced by the VR content from a difference between the visual recognition information and the posture recognition information,
   wherein the at least one processor is configured to:
   analyze a change in motion of the VR content the user recognizes with his or her eyes, using a convolutional neural network (CNN) and a convolutional long short-term memory (conv LSTM); and
   extract the visual recognition information of motion information according to the visual recognition motion feature of a temporal factor and a spatial factor using the CNN and the conv LSTM.

2. The apparatus of claim 1, wherein the at least one processor is configured to:
   analyze a temporal change in head location information received from the sensing module including at least one or more of a motion sensor configured to obtain motion information of the user and a VR player worn by the user, using an LSTM; and extract the posture recognition motion feature using the LSTM.

3. A virtual reality (VR) content sickness evaluating apparatus, the apparatus comprising:

a memory; and at least one processor connected to the memory, and configured to execute computer readable instructions included in the memory, wherein the at least one processor is configured to analyze visual recognition information according to a visual recognition motion feature based on a change in motion of VR content;

analyze posture recognition information according to a posture recognition motion feature based on a change in motion of a user, the change being received from a sensing module; and determine a degree of sickness induced by the VR content from a difference between the visual recognition information and the posture recognition information, wherein the at least one processor is configured to:

analyze a temporal change characteristic of three-dimensional (3D) space coordinates received from the sensing module depending on a change in motion of the user and the posture recognition motion feature; and extract the posture recognition information of motion information.

4. The apparatus of claim 3, wherein the at least one processor is configured to:

generate a visual recognition motion map which is a motion map from an extracted visual recognition motion feature, and wherein the at least one processor is configured to:

generate a posture recognition motion map which is a motion map from an extracted posture recognition motion feature.

5. The apparatus of claim 4, wherein the at least one processor is configured to:

generate a motion mismatch map through a difference between the visual recognition motion map and the posture recognition motion map.

6. The apparatus of claim 5, wherein the at least one processor is configured to:

discriminate real motion or fake motion for the generated motion mismatch map by discriminating between the generated motion mismatch map and a real motion mismatch map.

7. The apparatus of claim 6, wherein the at least one processor is configured to:

quantify and evaluate a sickness degree obtained from difference data between the visual recognition information and the posture recognition information and a sickness obtained from the generated motion mismatch map.

8. A method of evaluating a VR content sickness evaluating apparatus, the method comprising:

analyzing visual recognition information according to a visual recognition motion feature based on a change in motion of VR content;

analyzing posture recognition information according to a posture recognition motion feature based on a change in motion of a user, the change being received from a sensing module; and determining a degree of sickness induced by the VR content from a difference between the visual recognition information and the posture recognition information, wherein the analyzing of the visual recognition information comprises:

analyzing a change in motion of the VR content the user recognizes with his or her eyes, using a CNN and a conv LSTM; and extracting the visual recognition information of motion information according to the visual recognition motion feature of a temporal factor and a spatial factor using the CNN and the conv LSTM.

9. The method of claim 8, wherein the analyzing of the posture recognition information comprises:

analyzing a temporal change in head location information received from the sensing module including at least one or more of a motion sensor configured to obtain motion information of the user and a VR player worn by the user, using an LSTM; and extracting the posture recognition motion feature using the LSTM.

10. The method of claim 9, wherein the analyzing of the posture recognition information comprises:

analyzing a temporal change characteristic of 3D space coordinates received from the sensing module depending on a change in motion of the user and the posture recognition motion feature; and extracting the posture recognition information of motion information.

11. The method of claim 8, wherein the determining of the degree of the sickness induced by the VR content comprises:

generating a motion mismatch map through a difference between a visual recognition motion map and a posture recognition motion map;

discriminating between the generated motion mismatch map and a real motion mismatch map; and quantifying and evaluating a sickness degree obtained from difference data between the visual recognition information and the posture recognition information and a sickness obtained from the generated motion mismatch map.

12. The method of claim 11, wherein the discriminating between the generated motion mismatch map and the real motion mismatch map comprises:

discriminating real motion or fake motion for the generated motion mismatch map.

* * * * *